(12) United States Patent
Nagabhushanrao et al.

(10) Patent No.: US 12,556,027 B2
(45) Date of Patent: Feb. 17, 2026

(54) OPTIMIZED UPS POWER ARCHITECTURE FOR POWER AUGMENTATION TYPE OF APPLICATIONS

(71) Applicant: SCHNEIDER ELECTRIC IT CORPORATION, Foxboro, MA (US)

(72) Inventors: Pradeep Tolakanahalli Nagabhushanrao, Bangalore (IN); Chandrasekaran Jayaraman, Bangalore (IN); Anil Cheniveettil Suresh, Malappuram DT (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 17/810,054

(22) Filed: Jun. 30, 2022

(65) Prior Publication Data

US 2024/0006912 A1    Jan. 4, 2024

(51) Int. Cl.
  *H02J 7/00*   (2006.01)
  *H02J 9/06*   (2006.01)
(52) U.S. Cl.
  CPC .......... *H02J 9/062* (2013.01); *H02J 7/00712* (2020.01)
(58) Field of Classification Search
  CPC .............................. H02J 9/062; H02J 7/00712
  USPC ............................................................ 307/142
  See application file for complete search history.

(56) References Cited

U.S. PATENT DOCUMENTS

| | | | |
|---|---|---|---|
| 4,673,825 A | 6/1987 | Raddi et al. | |
| 7,456,518 B2 | 11/2008 | Hjort et al. | |
| 8,400,014 B2 * | 3/2013 | Li | H02J 7/0068 307/64 |
| 8,803,361 B2 | 8/2014 | Johansen et al. | |
| 2006/0043792 A1 * | 3/2006 | Hjort | H02J 9/062 307/1 |
| 2010/0225170 A1 * | 9/2010 | Hjort | H02J 7/0048 307/65 |
| 2012/0092908 A1 * | 4/2012 | Piotr | H01F 30/02 363/71 |
| 2017/0033597 A1 * | 2/2017 | Garrity | H02J 7/35 |
| 2020/0006943 A1 * | 1/2020 | Strong, Jr. | H02J 3/32 |
| 2021/0036698 A1 * | 2/2021 | Nakano | H03K 17/0824 |

(Continued)

FOREIGN PATENT DOCUMENTS

WO    0113491 A1    2/2001

OTHER PUBLICATIONS

Extended European Search Report in EP23181514.3, mailed Dec. 8, 2023, 9 pages.

*Primary Examiner* — Rexford N Barnie
*Assistant Examiner* — Xuan Ly
(74) *Attorney, Agent, or Firm* — Kinney & Lange, P.A.

(57) ABSTRACT

According to at least one aspect of the disclosure, a uninterruptible power supply includes a first input configured to be coupled to, and receive main power from, a main power source, a second input configured to be coupled to, and receive backup power from, a backup power source, an output configured to be coupled to at least one load, at least one current sensor, a four-quadrant inverter coupled to the first input, the second input, and the output, and at least one controller configured to control the four-quadrant inverter to provide power derived from the first input to the second input to charge the backup power source, and provide power derived from the second input to the output to supplement the main power.

20 Claims, 8 Drawing Sheets

(56) References Cited

U.S. PATENT DOCUMENTS

| | | |
|---|---|---|
| 2022/0123556 A1 | 4/2022 | Demissie et al. |
| 2023/0261519 A1* | 8/2023 | Ballantine ......... H01M 8/04932 307/23 |

* cited by examiner

OPTIMIZED UPS POWER ARCHITECTURE FOR POWER AUGMENTATION TYPE OF APPLICATIONS

BACKGROUND

1. Field of the Disclosure

At least one example in accordance with the present disclosure relates generally to power devices.

2. Discussion of Related Art

Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, derived from a backup source of power, such as an energy-storage device, if the primary source of power is unavailable.

SUMMARY

According to at least one aspect of the present disclosure, an uninterruptible power supply (UPS) is provided comprising a first input configured to be coupled to, and receive main power from, a main power source, a second input configured to be coupled to, and receive backup power from, a backup power source, an output configured to be coupled to at least one load, at least one current sensor, a four-quadrant inverter coupled to the first input, the second input, and the output, and at least one controller configured to control the four-quadrant inverter to provide power derived from the first input to the second input to charge the backup power source, and provide power derived from the second input to the output to supplement the main power.

In at least one example, the at least one controller is further configured to receive, from the at least one current sensor, current information indicative of the main power received from the main power source. In some examples, the at least one controller is further configured to control the four-quadrant inverter to provide the power to derived from the first input to the second input responsive to determining based on the current information that the main power exceeds a power draw of the at least one load. In various examples, the at least one controller is further configured to control the four-quadrant inverter to provide power derived from the second input to the output to supplement the main power responsive to determining based on the current information that the main power is less than a power draw of the at least one load. In at least one example, the at least one controller is further configured to determine, based on the current information, a difference between a power draw of the at least one load and the main power, and control the four-quadrant inverter to provide the difference between the power draw of the at least one load and the main power.

In some examples, the at least one controller is further configured to control the four-quadrant inverter in a current-source mode to provide the difference between the power draw of the at least one load and the main power. In various examples, the at least one controller is further configured to control the four-quadrant inverter, responsive to determining based on the current information that the main power is unavailable, to provide power derived from the second input to the output. In at least one example, the at least one controller is further configured to control the four-quadrant inverter in a voltage-source mode to provide the power derived from the second input to the output. In some examples, the UPS includes a voltage-level converter coupled to the output. In various examples, the voltage-level converter includes an autotransformer.

According to at least one aspect of the disclosure, a non-transitory computer-readable medium storing thereon sequences of computer-executable instructions for controlling a power supply comprising a first input configured to be coupled to a main power source, a second input configured to be coupled to a backup power source, an output configured to be coupled to at least one load, at least one current sensor, and a four-quadrant inverter coupled to the first input, the second input, and the output is provided, the sequences of computer-executable instructions including instructions that instruct at least one processor to control the four-quadrant inverter to provide power derived from the first input to the second input to charge the backup power source, and provide power derived from the second input to the output to supplement the main power.

In at least one example, the instructions are further configured to instruct the at least one processor to receive, from the at least one current sensor, current information indicative of the main power available from the main power source. In some examples, the instructions are further configured to instruct the at least one processor to control the four-quadrant inverter to provide the power derived from the first input to the second input responsive to determining based on the current information that the main power exceeds a power draw of the at least one load. In various examples, the instructions are further configured to instruct the at least one processor to control the four-quadrant inverter to provide the power derived from the second input to the output to supplement the main power responsive to determining based on the current information that the main power is less than a power draw of the at least one load.

In at least one example, the instructions are further configured to instruct the at least one processor to determine, based on the current information, a difference between the power draw of the at least one load and the main power, and control the four-quadrant inverter to provide the difference between the power draw of the at least one load and the main power. In some examples, the instructions are further configured to instruct the at least one processor to control the four-quadrant inverter in a current-source mode to provide a difference between the power draw of the at least one load and the main power. In various examples, the instructions are further configured to instruct the at least one processor to control the four-quadrant inverter, responsive to determining based on the current information that the main power is unavailable, to provide power derived from the second input to the output. In at least one example, the instructions are further configured to instruct the at least one processor to control the four-quadrant inverter in a voltage-source mode to provide the generated AC power to the output.

According to at least one aspect of the disclosure, a method of controlling a power supply comprising a first input configured to be coupled to a main power source, a second input configured to be coupled to a backup power source, an output configured to be coupled to at least one load, at least one current sensor, and a four-quadrant inverter coupled to the first input, the second input, and the output is provided, the method comprising providing, by the four-quadrant inverter, power derived from the first input to the second input to charge the backup power source, and providing, by the four-quadrant inverter, power derived from the second input to the output to supplement the main power.

In at least one example, the method includes receiving, from the at least one current sensor, current information indicative of the main power available from the main power source, determining, based on the current information, that the main power is less than a power draw of the at least one load, providing, responsive to determining that the main power is less than the power draw of the at least one load, the power derived from the second input to the output to supplement the main power.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
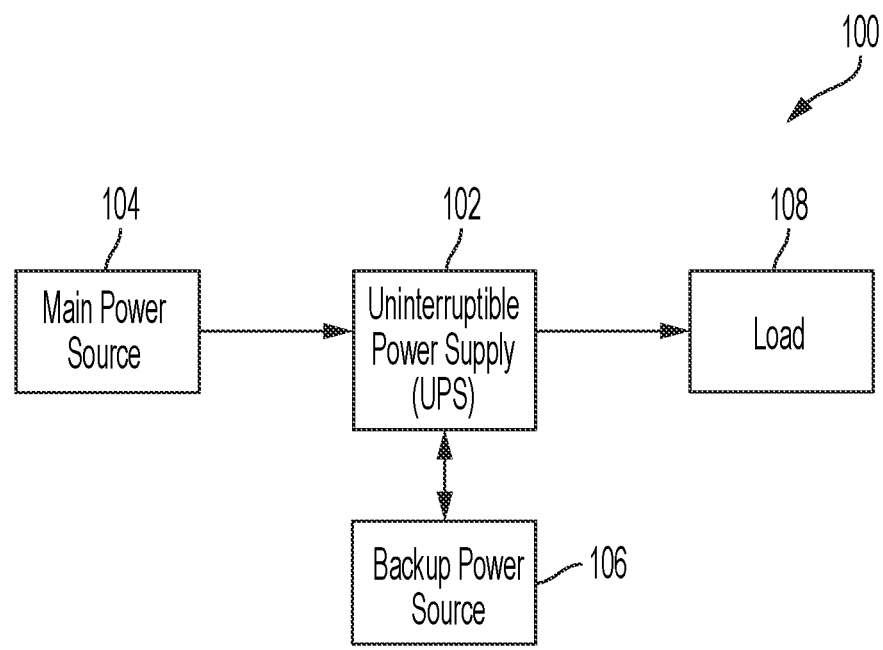
FIG. 1 illustrates a block diagram of a power system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Power devices, such as uninterruptible power supplies (UPS s), may provide output power derived from one of several sources to a load. For example, a UPS may be coupled to a main power source, such as a utility grid, and to a backup power source, such as an energy-storage device. If the main power source is available, then the UPS may provide output power derived from the main power source to the load. If the main power source is not available (for example, due to a blackout on a utility grid), then the UPS may provide output power derived from the energy-storage device to the load.

However, even if a main power source is available to provide power, an amount of power required by a load may exceed power available from the main power source. Examples of the disclosure provide a power device configured to supplement main power from a main power source with backup power from a backup power source. In at least one example, if an amount of power required by a load exceeds an amount of power available from the main power source, the power device may draw backup power from the backup power source to account for the excess power requirement.

The power device may include a four-quadrant inverter configured to operate in a current-source mode and/or a voltage-source mode. The power device may operate the four-quadrant inverter in the current-source mode to supplement the main power in providing power to the load. The power device may operate the four-quadrant inverter in the voltage-source mode to provide the output power to the load when the main power is unavailable, and/or to provide charging power to the backup power source when the main power is available and the backup power source is to be recharged. Accordingly, example power devices provided herein may be advantageously able to supplement main power with backup power as requested by a load.

FIG. 1 illustrates a block diagram of a power system 100 according to an example. The power system 100 includes at least one uninterruptible power supply (UPS) 102 ("UPS 102"), at least one main power source 104 ("main power source 104"), at least one backup power source 106 ("backup power source 106), and at least one load 108 ("load 108"). The main power source 104 may include a grid supply, such as a utility grid. The backup power source 106 may include an energy-storage device, such as a battery. The load 108 may include a power-consuming electronic device, such as a server, medical equipment, emergency lighting, and so forth.

The main power source 104 is coupled to, and is configured to provide main power to, the UPS 102. The UPS 102 is coupled to, and configured to receive main power from, the main power source 104 at a first input, is coupled to, and is configured to receive backup power from, the backup power source 106 at a second input, and is coupled to, and is configured to provide output power to, the load 108 at an output. The backup power source 106 is coupled to, and is configured to provide power to and receive power from, the UPS 102. The load 108 is coupled to, and is configured to receive output power from, the UPS 102.

The UPS 102 may be configured to provide output power to the load 108. The UPS 102 may derive the output power received from the main power received from the main power source 104 and/or the backup power received from the backup power source 106. For example, if the main power is available and exceeds the power requirements of the load 108, then the UPS 102 may derive the output power substantially entirely from the main power source 104. In some examples, the UPS 102 may also provide recharging power derived from the main power source 104 to the backup power source 106. If the main power is not available, then the UPS 102 may instead derive the output power from the backup power source 106.

As discussed above, however, in some examples a power draw of the load 108 may exceed an amount of power available from the main power source 104. Stated mathematically, an amount of excess power drawn by the load 108 may be defined by Equation (1):

$$P_{excess} = P_{load} - P_{main}$$

where $P_{load}$ is an amount of power drawn by the load 108, $P_{main}$ is an amount of main power available from the main power source 104 (for example, determined based on a current threshold indicative of a current rating of the UPS 102), and $P_{excess}$ is a difference between the amount of power drawn by the load and the amount of main power available. In some examples, $P_{main}$ may be limited by a current rating of the UPS 102. For example, a current rating of the UPS 102 may be imposed by a circuit breaker such that $P_{main}$ is maintained at or below a power level above which the circuit breaker may be tripped.

If $P_{load}$ exceeds $P_{main}$, then the UPS 102 may be configured to draw an amount of backup power from the backup power source 106 approximately equal to or greater than P excess to satisfy the amount of power $P_{load}$ drawn by the load 108. Accordingly, the UPS 102 may be able to provide output power derived from both the main power source 104 and the backup power source 106 such that the output power is greater than that available from only the main power source 104.

Figure 2:
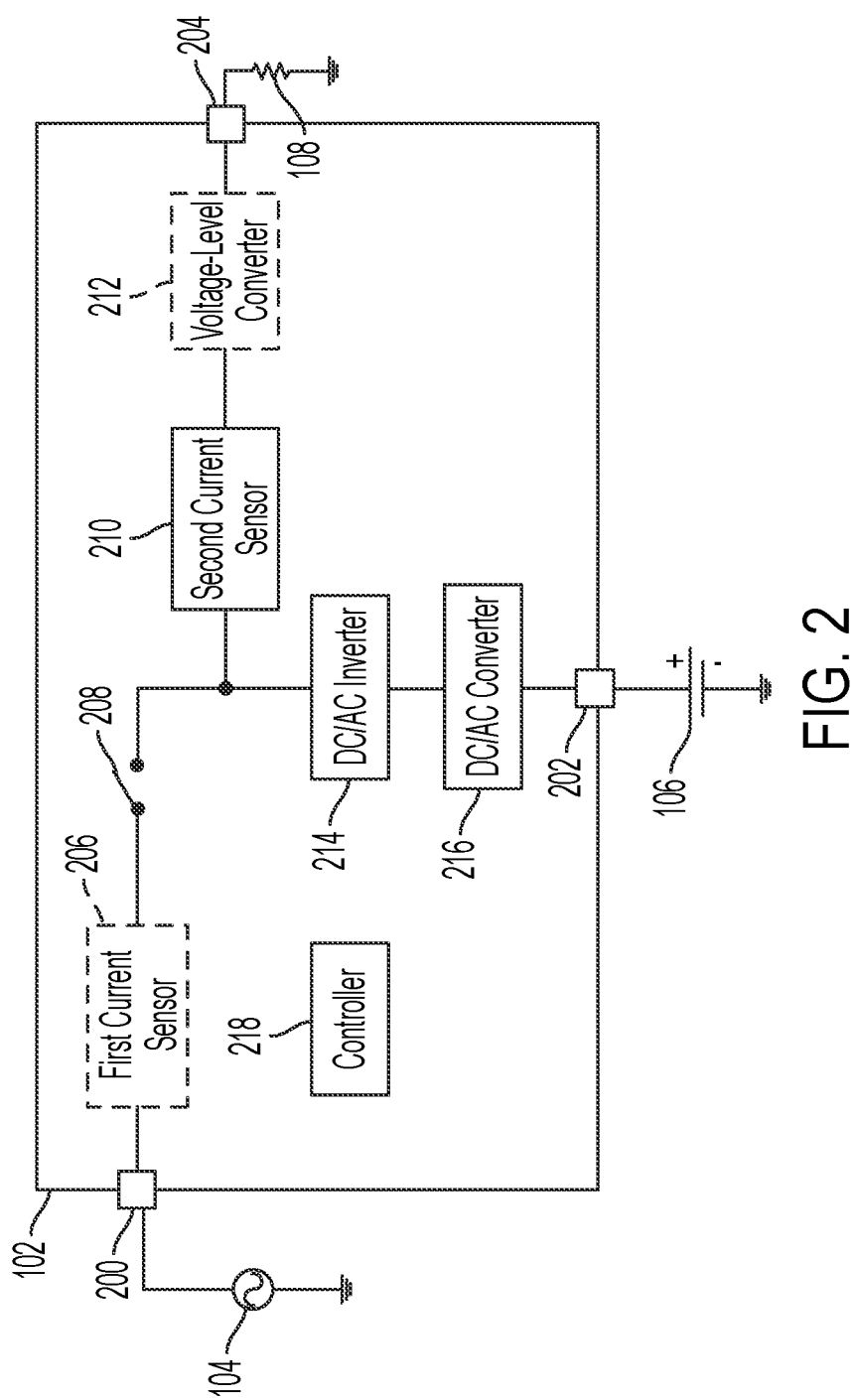
FIG. 2 illustrates a block diagram of an uninterruptible power supply according to an example.

FIG. 2 illustrates a block diagram of a UPS 250 according to an example. FIG. 2 may illustrate an example of the UPS 250. The UPS 250 includes a first input 200, a second input 202, an output 204, optionally at least one first current sensor and/or at least one voltage sensor 206 ("first current sensor 206"), a switching device 208 (for example, a switch such as a MOSFET, BJT, IGBT, a relay, a combination of the foregoing, and so forth), at least one second current sensor and/or at least one voltage sensor 210 ("second current sensor 210"), optionally at least one voltage-level converter 212 ("voltage converter 212"), a DC/AC inverter 214, a DC/DC converter 216, and at least one controller 218 ("controller 218"). In various examples, the optional first current sensor 206 and/or optional voltage converter 212 may be omitted. In some examples, one or more components of the UPS 250 may be bi-directional, such as the DC/AC inverter 214 and/or DC/DC converter 216. In at least one example, the DC/AC inverter 214 may be or include a four-quadrant inverter and can therefore provide and compensate for reactive power in addition to real power.

The first input 200 is coupled to the first current sensor 206 (or to the switching device 208 in examples in which the first current sensor 206 is omitted) and is configured to be coupled to the main power source 104. The second input 202 is coupled to the DC/DC converter 216 and is configured to be coupled to the backup power source 106. The output 204 is coupled to the voltage converter 212 (or to the second current sensor 210 in examples in which the voltage converter 212 is omitted) and is configured to be coupled to the load 108. In examples in which the first current sensor 206 is included, the first current sensor 206 is coupled to the first input 200 at a first connection and is coupled to the switching device 208 at a second connection. The first current sensor 206 is also configured to be communicatively coupled to the controller 218.

The switching device 208 is coupled to the first current sensor 206 at a first connection (or to the first input 200 in examples in which the first current sensor 206 is omitted), and is coupled to the second current sensor 210 and the DC/AC inverter 214 at a second connection. The switching device 208 is also configured to be communicatively coupled to the controller 218. The second current sensor 210 is coupled to the switching device 208 and to the DC/AC inverter 214 at a first connection and is coupled to the voltage converter 212 (or to the output 204 in examples in which the voltage converter 212 is omitted) at a second connection. The second current sensor 210 is also configured to be communicatively coupled to the controller 218. In examples in which the voltage converter 212 is included, the voltage converter 212 is coupled to the second current sensor 210 at a first connection and to the output 204 at a second connection.

The DC/AC inverter 214 is coupled to the switching device 208 and to the second current sensor 210 at a first connection (for example, an AC connection) and is coupled to the DC/DC converter 216 at a second connection (for example, a DC connection). The DC/AC inverter 214 is also communicatively coupled to the controller 218. The DC/DC converter 216 is coupled to the DC/AC inverter 214 at a first connection and is coupled to the second input 202 at a second connection. The DC/DC converter 216 is also communicatively coupled to the controller 218. The controller 218 may be communicatively coupled to the first current sensor 206, the switching device 208, the second current sensor 210, the voltage converter 212, the DC/AC inverter 214, and the DC/DC converter 216. In some examples, the controller 218 may be communicatively coupled to the main power source 104 (or a control device associated therewith, such as a grid controller), the backup power source 106, and/or the load 108.

As discussed in greater detail below, the UPS 250 is configured to provide output power to the load 108 via the output 204. If mains power is available from the main power source 104, the UPS 250 may derive output power from the main power source 104 via the first input 200. If excess mains power is available and the backup power source 106 is not fully charged, the UPS 250 may provide recharging power derived from the mains power to the backup power source 106 via the second input 202. If the mains power is available but not sufficient to satisfy the load 108, the UPS 250 may draw supplemental power from the backup power source 106 via the second input 202 to provide to the load 108 via the output 204. If the mains power is not available but backup power is available, the UPS 250 may draw backup power from the backup power source 106 via the second input 202 to provide to the load 108 via the output 204. Operation of the UPS 250 is discussed in greater detail with respect to FIG. 3.

Figure 3:
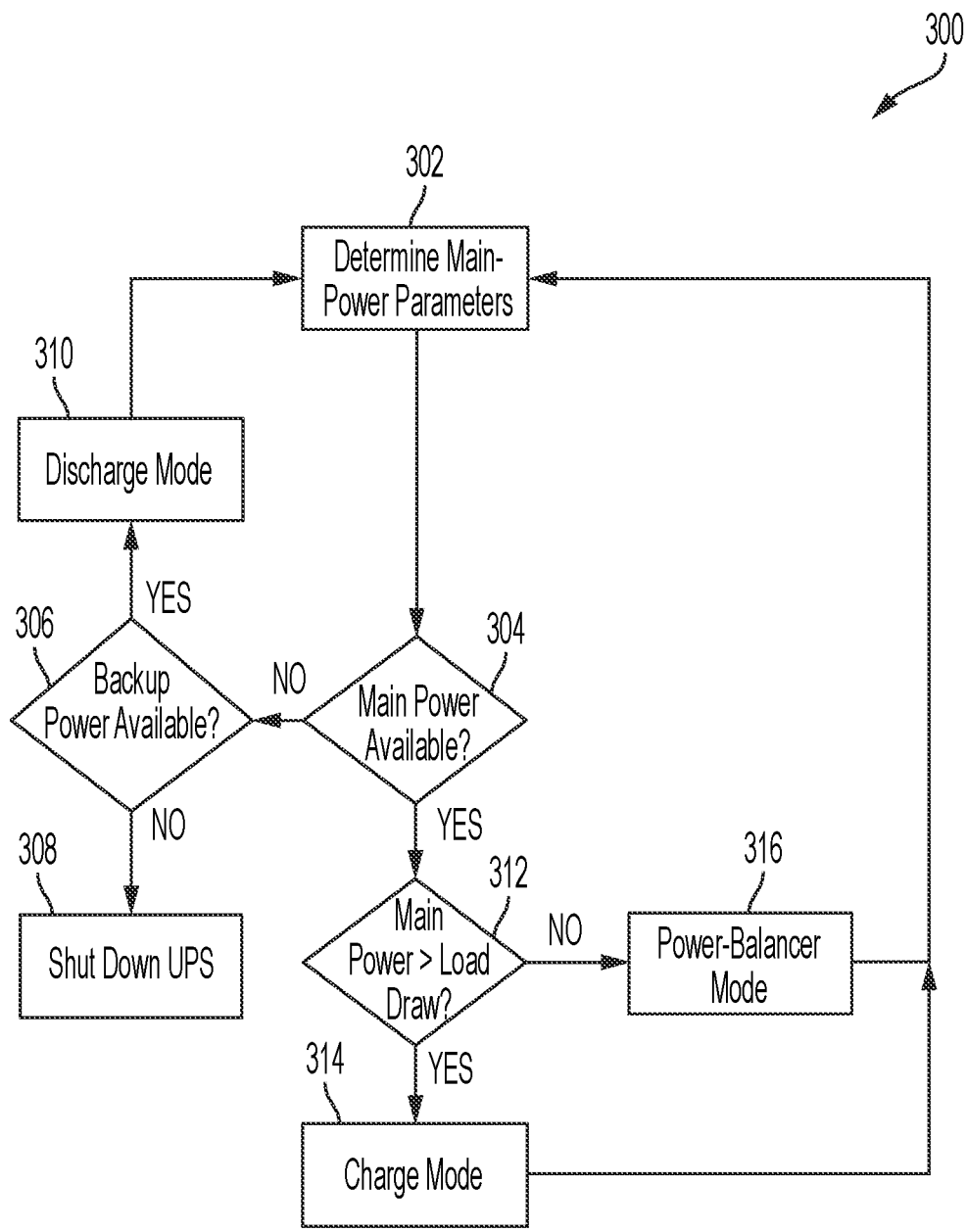
FIG. 3 illustrates a process of operating the uninterruptible power supply according to an example.

FIG. 3 illustrates a process 300 of operating the UPS 250 according to an example. The process 300 may be executed by the controller 218.

At act 302, the controller 218 determines one or more main-power parameters. Main-power parameters may include one or more parameters indicative of main power available from the main power source 104 at the first input 200, such as a voltage level, current level, frequency, and so forth. The controller 218 may receive information indicative of the main-power parameters from one or both of the first current sensor 206 and/or the second current sensor 210.

At act 304, the controller 218 determines whether main power is available from the main power source 104. For example, the controller 218 may analyze the one or more main-power parameters to determine whether main power is available as indicated by, for example, whether a current and/or voltage level are within, above, or below certain ranges and/or thresholds. Main power may be available where, for example, the main power source 104 is operating normally and/or as intended. Main power may not be available where, for example, the main power source 104 experiences a grid outage or blackout. If the controller 218 determines that main power is not available (304 NO), then the process 300 continues to act 306.

At act 306, the controller 218 determines whether backup power is available from the backup power source 106. For example, the controller 218 may be communicatively coupled to the backup power source 106, one or more sensors coupled thereto, a control device associated therewith (for example, a controller), and so forth, configured to provide information indicative of an amount of power available from (for example, stored by) the backup power source 106. Determining whether backup power is available may include determining whether an energy level of the backup power source 106 is above a threshold level, such as by having a state-of-charge (SOC) above a threshold SOC. If backup power is not available (306 NO), then the process 300 continues to act 308.

At act 308, the controller 218 shuts down the UPS 250. Because mains power is not available (304 NO) and backup power is not available (306 NO), the UPS 250 may be unable to provide output power to the load 108. Accordingly, the controller 218 may shut down the UPS 250 until mains power is again available to the UPS 250. Shutting down the UPS 250 may include powering down one or more components of the UPS 250, such as by disabling power to the DC/AC inverter 214 and/or DC/DC converter 216, reducing a frequency at which the current sensors 206, 210 are polled, disabling certain logic or control functionality of the controller 218, and so forth. The process 300 may then end and, if mains power is subsequently available, the process 300 may again be executed beginning at act 302.

Returning to act 306, if backup power is available (306 YES), then the process 300 continues to act 310.

Figure 4:
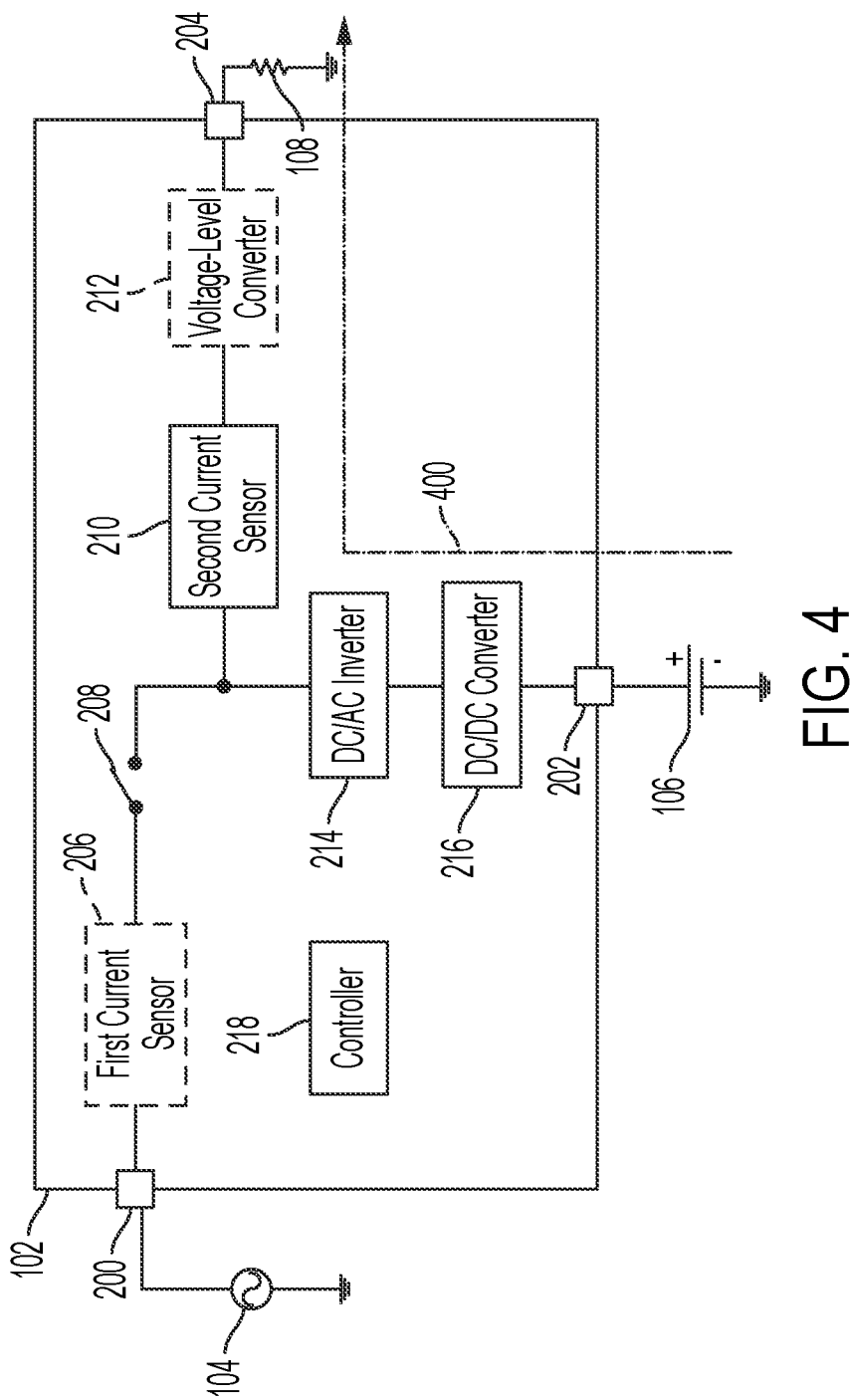
FIG. 4 illustrates a block diagram of the uninterruptible power supply in a discharge mode of operation according to an example.

At act 310, the controller 218 operates the UPS 250 in a discharge mode of operation. FIG. 4 illustrates a block diagram of the UPS 250 in the discharge mode of operation. FIG. 4 is similar to FIG. 2 and includes a current trace 400 indicating a direction of current in one example of the discharge mode of operation. In the discharge mode of operation, the controller 218 controls the switching device 208 to be in an open and non-conducting position. The controller 218 may also control the DC/DC converter 216 to draw backup power from the backup power source 106 via the second input 202 and convert the backup power to converted DC power. The controller 218 controls the DC/AC inverter 214 to draw the converted DC power from the DC/DC converter 216, convert the converted DC power to AC power, and provide the AC power to the second current sensor 210. In various examples, the DC/AC inverter 214 and DC/DC converter 216 may each include one or more switches, and the controller 218 may control a switching state of each of the one or more switches to operate the components 214, 216.

The AC power is provided to the second current sensor 210, which may provide information indicative of the AC power to the controller 218. In examples in which the voltage converter 212 is included, the voltage converter 212 may convert a voltage level of the AC power if desired, and provide the converted AC power to the output 204. For example, the voltage converter 212 may include a multi-tap transformer (for example, an autotransformer) for which each tap corresponds to a respective voltage level, and an appropriate tap may provide power to the load 108. Otherwise, the AC power may be provided directly to the output 204. The AC power is then provided to the load 108 via the output 204.

As discussed above, the DC/AC inverter 214 may be a four-quadrant inverter in some examples. The controller 218 may control the DC/AC inverter 214 to operate as a voltage source in the discharge mode of operation. At least because the DC/AC inverter 214 may be a four-quadrant inverter, the DC/AC inverter 214 may provide power with positive current and positive voltage, positive current and negative voltage, negative current and negative voltage, and/or negative current and positive voltage.

The process 300 may then return to act 302, and the process 300 may be repeated. Returning to act 304, if main power is available (304 YES), then the process 300 may continue to act 312.

At act 312, the controller 218 determines whether the available mains power exceeds output power requested by the load 108. For example, the controller 218 may compare a current value of the mains power to a stored current-threshold value. The stored current-threshold value may represent a maximum amount of current that should be drawn from the main power source 104 without, for example, risking tripping a circuit breaker. If the mains-power current is less than the current-threshold value, then the controller 218 may determine that the available mains power is greater than the output power requested by the load (312 YES). The process 300 then continues to act 314.

Figure 5:
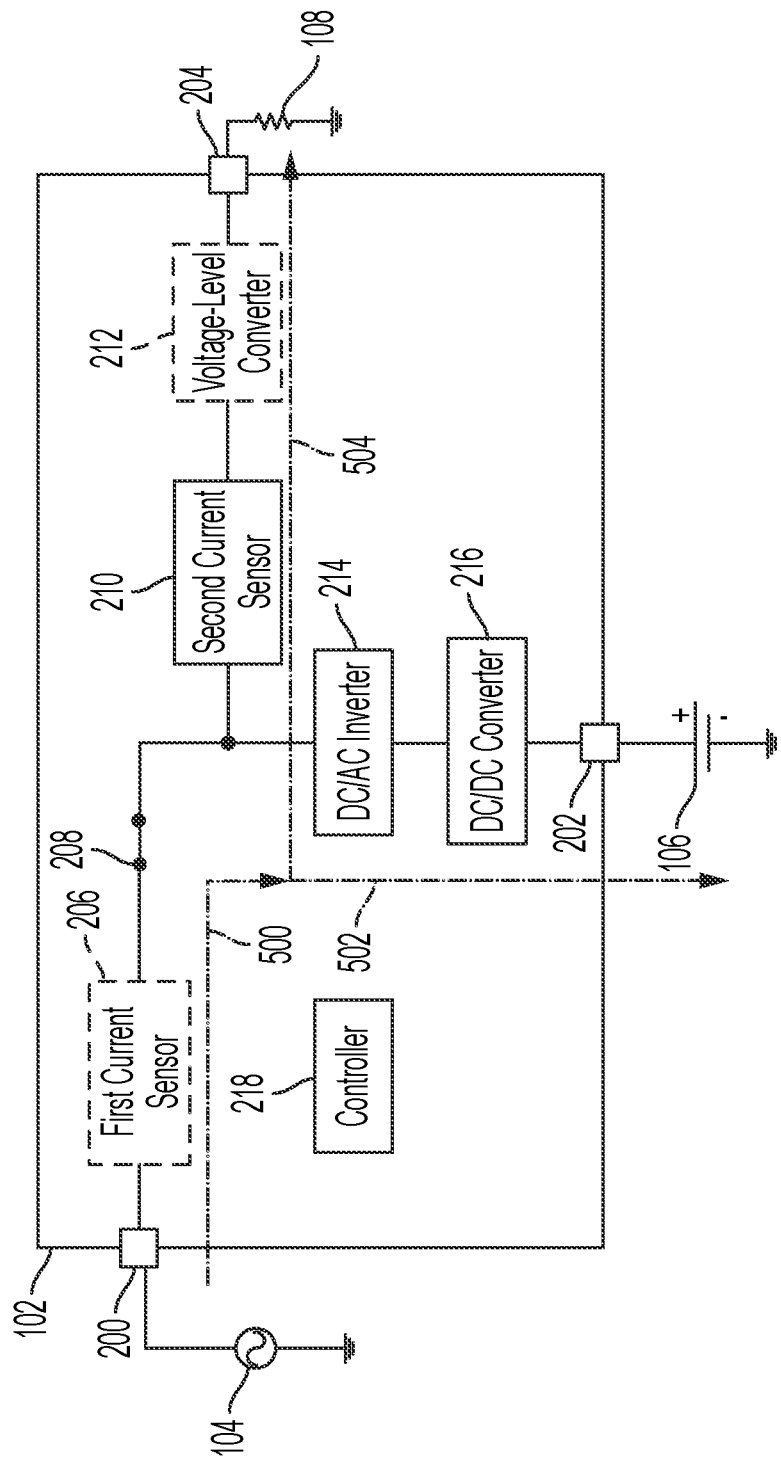
FIG. 5 illustrates a block diagram of the uninterruptible power supply in a charge mode of operation according to an example.

At act 314, the controller 218 controls the UPS 250 to operate in a charge mode of operation. In the charge mode of operation, the controller 218 may operate the UPS 250 to make recharging power available to the backup power source 106 to recharge the backup power source 106 if the backup power source 106 is not charged (for example, above a threshold charge value). FIG. 5 illustrates a block diagram of the UPS 250 in the charge mode of operation. FIG. 5 is similar to FIG. 2 and includes a first current trace 500 indicating a direction of a first current, a second current trace 502 indicating a direction of a second current, and a third current trace 504 indicating a direction of a third current in an example of the charge mode of operation.

The controller 218 may control the switching device 208 to be closed and conducting. As indicated by the first current trace 500, the first current is received from the main power source 104 at the first input 200 and provided through the first current sensor 206 and the switching device 208. A first portion of the first current is provided to the DC/AC inverter 214 as the second current indicated by the second current trace 502, and a second portion of the first current is provided to the second current sensor 210 as the third current indicated by the third current trace 504. In some examples (for example, where the backup power source 106 is not recharged because, for example, the backup power source 106 is fully charged), the second current is approximately zero and the first current is approximately equal to the third current.

As indicated by the second current trace 502, the controller 218 operates the DC/AC inverter 214 to draw a portion of the first current, convert the drawn power to DC power, and provide the DC power to the DC/DC converter 216. In some examples, the drawn power is AC power. Accordingly, it is to be appreciated that although the DC/AC inverter 214 may invert DC power to AC power, the DC/AC inverter 214 may be bidirectional and capable of converting AC power to DC power. The controller 218 controls the DC/DC converter 216 to draw the DC power, convert the DC power to recharging DC power, and provide the recharging DC power to the backup power source 106 via the second input 202 to recharge the backup power source 106. As discussed above, in some examples of the charge mode of operation, recharging power may be available to the backup power source 106 but may not be actively provided to the backup power source 106 (for example, because the backup power source 106 is fully charged, or because the available mains power is equal to the power requested by the load and no excess power is available).

As indicated by the third current trace 504, the third current is provided to the second current sensor 210. The second current sensor 210 may provide information indicative of the third current to the controller 218. In examples in which the voltage converter 212 is included, the voltage converter 212 may convert the third current to a desired voltage level and provide the converted third current to the load 108 via the output 204. Otherwise, the third current may be provided directly to the load 108 via the output 204.

As discussed above, the DC/AC inverter 214 may be a four-quadrant inverter in some examples. The controller 218 may control the DC/AC inverter 214 to operate as a voltage source in the charge mode of operation.

The process 300 may then return to act 302, and the process 300 may be repeated. Returning to act 312, if main power is equal to or less than the requested load power (312 NO), then the process 300 continues to act 316.

Figure 6:
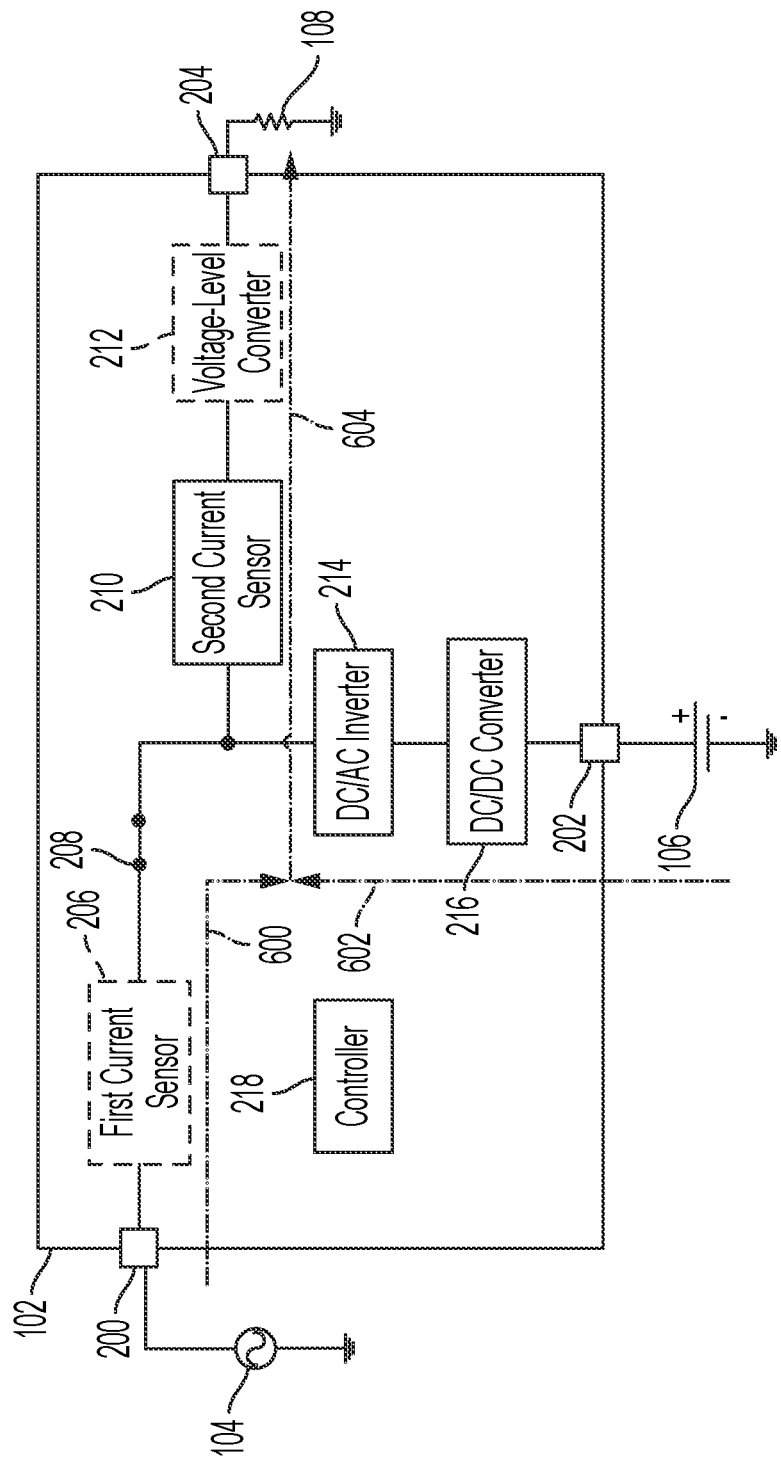
FIG. 6 illustrates a block diagram of the uninterruptible power supply in a power-balancer mode of operation according to an example.

At act 316, the controller 218 operates the UPS 250 in a power-balancer mode of operation. In the power-balancer mode of operation, the controller 218 may operate the UPS 250 to provide output power derived from both the main power source 104 and the backup power source 106 to satisfy a demand of the load 108. FIG. 6 illustrates a block diagram of the UPS 250 in the power-balancer mode of operation. FIG. 6 is similar to FIG. 2 and includes a first current trace 600 indicating a direction of a first current, a second current trace 602 indicating a direction of a second current, and a third current trace 604 indicating a direction of a third current in an example of the power-balancer mode of operation.

The controller 218 may control the switching device 208 to be closed and conducting. As indicated by the first current trace 600, the first current is received from the main power source 104 at the first input 200 and provided through the first current sensor 206 and the switching device 208. The first current is provided to the second current sensor 210 as a component of the third current.

As indicated by the second current trace 602, the second current is provided by the backup power source 106 to the second input 202. The controller 218 controls the DC/DC converter 216 to draw backup power from the backup power source 106 at the second input 202, convert the backup power to converted DC power, and provide the converted DC power to the DC/AC inverter 214. The controller 218 controls the DC/AC inverter 214 to draw the DC power from the DC/DC converter 216, convert the DC power to AC power, and provide the AC power to the second current sensor 210. The second current is provided to the second current sensor 210 as a component of the third current.

As discussed above, the DC/AC inverter 214 may be a four-quadrant inverter in some examples. The controller 218 may control the DC/AC inverter 214 to operate as a current source in the power-balancer mode of operation.

In various examples, the controller 218 may monitor the first current provided by the main power source 104 and control the DC/AC inverter 214 based on the first current. For example, the controller 218 may determine a value of the first current based on information provided by the first current sensor 206 and/or the second current sensor 210. The controller 218 may control the DC/AC inverter 214 to provide an amount of current approximately equal to a difference between the load power drawn by the load 108 and the main current available from the main power source 104 as discussed above with respect to Equation (1). The main current available from the main power source 104 may be determined based on a current rating of the UPS 102 which represents a maximum allowed value of the main current (and, thus, an amount of main current that the main power source 104 provides when the requested load current exceeds the threshold).

Controlling the DC/AC inverter 214 may therefore include determining a difference between an amount of load current requested by the load 180 and a stored current threshold, and controlling the DC/AC inverter 214 to supplement the main power with the difference. Controlling the DC/AC inverter 214 to supplement the main power may include controlling an input impedance of the DC/AC inverter 214 such that an amount of current drawn from the DC/DC converter 216 may be varied.

As indicated by the third current trace 604, the third current may represent a combination of the first current and the second current provided by the main power source 104 and the backup power source 106, respectively, and is provided to the second current sensor 210. In examples in which the voltage converter 212 is included, the voltage converter 212 may convert the third current to a desired voltage level and provide the converted third current to the load 108 via the output 204. Otherwise, the third current may be provided directly to the load 108 via the output 204. The process 300 may then return to act 302.

The process 300 provides an example of operating the UPS 250 to provide output power to the load 108. The power-balancer mode of operation enables the UPS 250 to satisfy loads exceeding available main power by supplementing the main power with backup power. In various examples, the DC/AC inverter 214 includes a four-quadrant inverter to supplement the main power. The controller 218 may control the four-quadrant inverter to act as a voltage source during a charge and discharge mode of operation, and to act as a current source during a power-balancer mode of operation.

Figure 7:
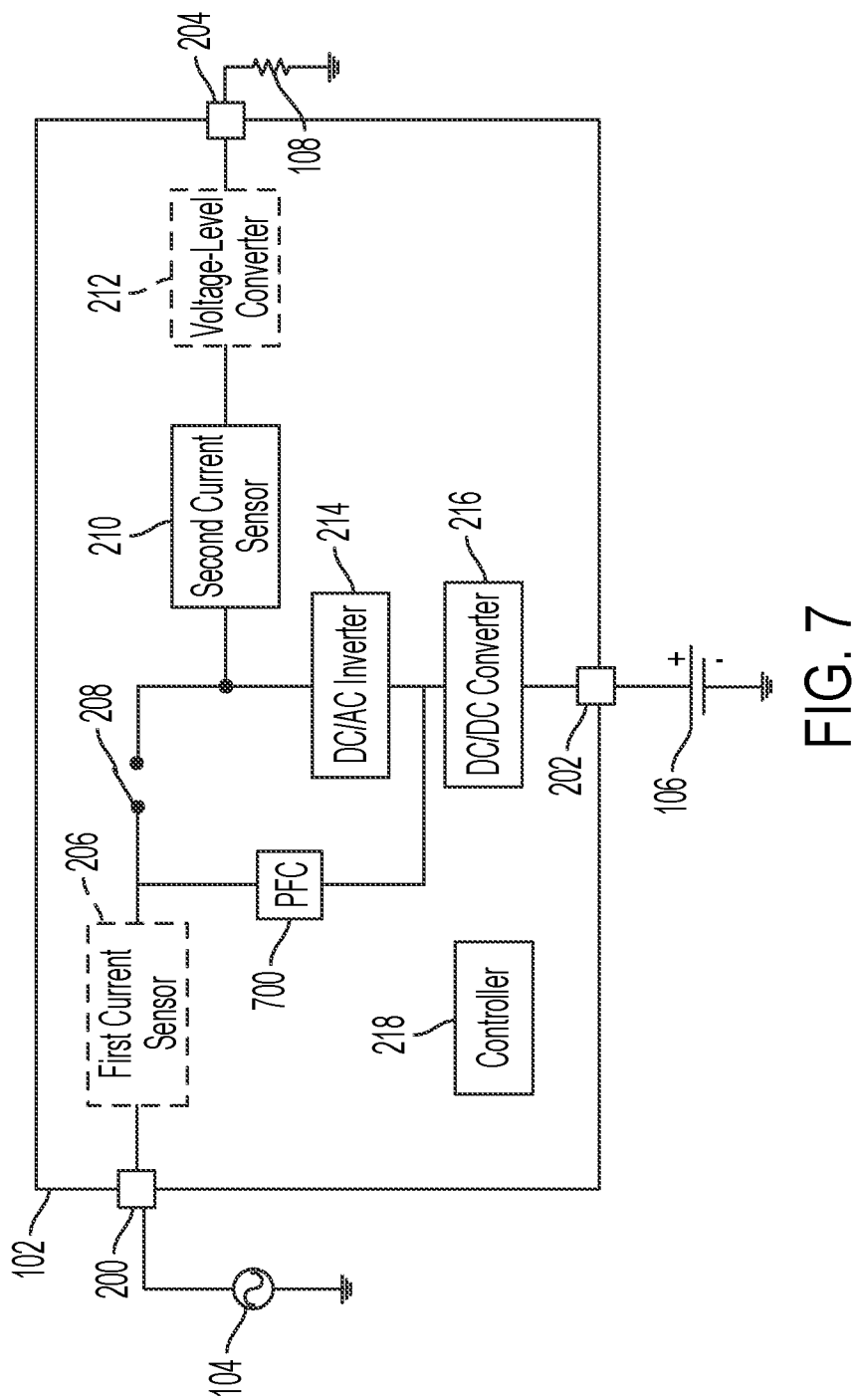
FIG. 7 illustrates a block diagram of an uninterruptible power supply according to another example.

In various examples, the UPS 102 may include additional or different components than those illustrated in the example UPS 250 of FIG. 2. FIG. 7 illustrates a block diagram of a UPS 750 according to another example. The example of FIG. 7 includes similar components as the example of FIG. 2 and like components are labeled accordingly. In addition, the UPS 750 includes a power-factor-correction circuit (PFC) 700.

The UPS 250 may be advantageous where, for example, main power received from the main power source 104 is usually relatively high-quality power. However, if the main power received from the main power source 104 is not usually relatively high-quality power (for example, due to frequent voltage sags, grid blackouts, and so forth), output power derived from the main power may in turn be relatively low in quality. The UPS 750 may be advantageous where power quality is less reliable. As illustrated by FIG. 7, the PFC 700 is included and may advantageously improve power quality where power quality is less reliable.

In the example of FIG. 7, the first input 200 is coupled to the first current sensor 206 (or to the switching device 208 and the PFC 700 in examples in which the first current sensor 206 is omitted) and is configured to be coupled to the main power source 104. The second input 202 is coupled to the DC/DC converter 216 and is configured to be coupled to the backup power source 106. The output 204 is coupled to the voltage converter 212 (or to the second current sensor 210 in examples in which the voltage converter 212 is omitted) and is configured to be coupled to the load 108. In examples in which the first current sensor 206 is included, the first current sensor 206 is coupled to the first input 200 at a first connection and is coupled to the switching device 208 and the PFC 700 at a second connection. The first current sensor 206 is also configured to be communicatively coupled to the controller 218.

The switching device 208 is coupled to the first current sensor 206 and the PFC 700 at a first connection (or to the first input 200 in lieu of the first current sensor 206 in examples in which the first current sensor 206 is omitted), and is coupled to the second current sensor 210 and the DC/AC inverter 214 at a second connection. The switching device 208 is also configured to be communicatively coupled to the controller 218. The second current sensor 210 is coupled to the switching device 208 and to the DC/AC inverter 214 at a first connection and is coupled to the voltage converter 212 (or to the output 204 in examples in which the voltage converter 212 is omitted) at a second connection. The second current sensor 210 is also configured to be communicatively coupled to the controller 218. In examples in which the voltage converter 212 is included, the voltage converter 212 is coupled to the second current sensor 210 at a first connection and to the output 204 at a second connection.

The DC/AC inverter 214 is coupled to the switching device 208, the PFC 700, and the second current sensor 210 at a first connection (for example, an AC connection) and is coupled to the DC/DC converter 216 and the PFC 700 at a second connection (for example, a DC connection). The DC/AC inverter 214 is also communicatively coupled to the controller 218. The DC/DC converter 216 is coupled to the DC/AC inverter 214 and the PFC 700 at a first connection and is coupled to the second input 202 at a second connection. The DC/DC converter 216 is also communicatively coupled to the controller 218. The controller 218 may be communicatively coupled to the first current sensor 206, the switching device 208, the second current sensor 210, the voltage converter 212, the DC/AC inverter 214, the DC/DC converter 216, and the PFC 700. In some examples, the controller 218 may be communicatively coupled to the main power source 104 (or a control device associated therewith, such as a grid controller), the backup power source 106, and/or the load 108.

The PFC 700 is coupled to the first current sensor 206 and the switching device 208 at a first connection (or directly to the first input 200 in lieu of the first current sensor 206 in examples in which the first current sensor 206 is omitted), and is coupled to the DC/AC inverter 214 and the DC/DC converter 216 at a second connection. The PFC 700 may also be communicatively coupled to the controller 218.

The controller 218 may operate the UPS 750 based at least in part on a quality of the main power received at the first input 200. For example, the controller 218 may receive information from one or both of the sensors 206, 210 to determine a quality of the main power. If the quality of the main power is sufficiently high (for example, if the controller 218 determines that parameters of the voltage, frequency, and/or current of the main power are within certain ranges or above or below certain thresholds), then the controller 218 may operate the UPS 750 in a bypass mode of operation. Conversely, if the quality of the main power is not sufficiently high (for example, if the controller 218 determines that parameters of the voltage, frequency, and/or current of the main power are not within certain ranges or above or below certain thresholds), then the controller 218 may operate the UPS 750 in a PFC mode of operation.

In the bypass mode of operation, the controller 218 may disable the PFC 700, such as by controlling one or more switches of the PFC 700 to remain open (or by not controlling one or more switches of the PFC 700 to be closed). Accordingly, current may bypass the PFC 700. In the bypass mode of operation, the PFC 700 may be disregarded, and the UPS 750 operates in a manner substantially identical to the UPS 250.

In the PFC mode of operation, the controller 218 may control the PFC 700 to draw power from the first input 200 such that main power received at the first input 200 is provided to the PFC 700. The controller 218 may control the PFC 700 to provide power-factor correction to the main power. Power-factor-corrected power may be provided to the DC/AC inverter 214 and the DC/DC converter 216. The DC/AC inverter 214 may be operated by the controller 218 to provide AC power derived from the DC power to the output 204 via the second current sensor 210 and the optional voltage converter 212. The DC/DC converter 216 may be operated by the controller 218 to provide recharging power derived from the DC power to the second input 202 if recharging power is desired by the backup power source 106.

In various examples, the bypass mode of operation and the PFC mode of operation may not be mutually exclusive with the discharge mode of operation, charge mode of operation, and/or power-balancer mode of operation discussed above at acts 310, 314, and 316, respectively. For example, the controller 218 may control the UPS 750 to be in the bypass mode of operation and the discharge mode of operation, charge mode of operation, or power-balancer mode of operation at overlapping times. Similarly, the controller 218 may control the UPS 750 to be in the PFC mode of operation and the discharge mode of operation, charge mode of operation, or power-balancer mode of operation at overlapping times.

Accordingly, the UPS 750 may be substantially similar to the UPS 250 if the main-power quality is high and the PFC 700 may be bypassed. However, the PFC 700 may be implemented to improve a quality of the main power as desired, and the UPS 750 may otherwise be operated in a substantially similar manner as the UPS 250.

As discussed above, in various examples the DC/AC inverter 214 may provide DC power to, and receive DC power from, the DC/DC converter 216, and the DC/DC converter 216 may provide DC power to, and receive DC power from, the DC/AC inverter 214. In some examples, the DC/AC inverter 214 is coupled to the DC/DC converter 216 via one or more DC busses. For example, the DC/AC inverter 214 may be coupled to the DC/DC converter 216 via a positive DC bus and a negative DC bus. The positive DC bus may be coupled to the DC/AC inverter 214, the DC/DC converter 216, and a positive DC capacitor. The negative DC bus may be coupled to the DC/AC inverter 214, the DC/DC converter 216, and a negative DC capacitor. The positive DC capacitor may be coupled between the positive DC bus and a reference node, such as a neutral node. The negative DC capacitor may be coupled between the negative DC bus and the reference node. The positive and negative DC capacitors may store energy and the DC/AC inverter 214 and the DC/DC converter 216 may draw power from the positive and/or negative DC capacitors as needed.

Figure 8:
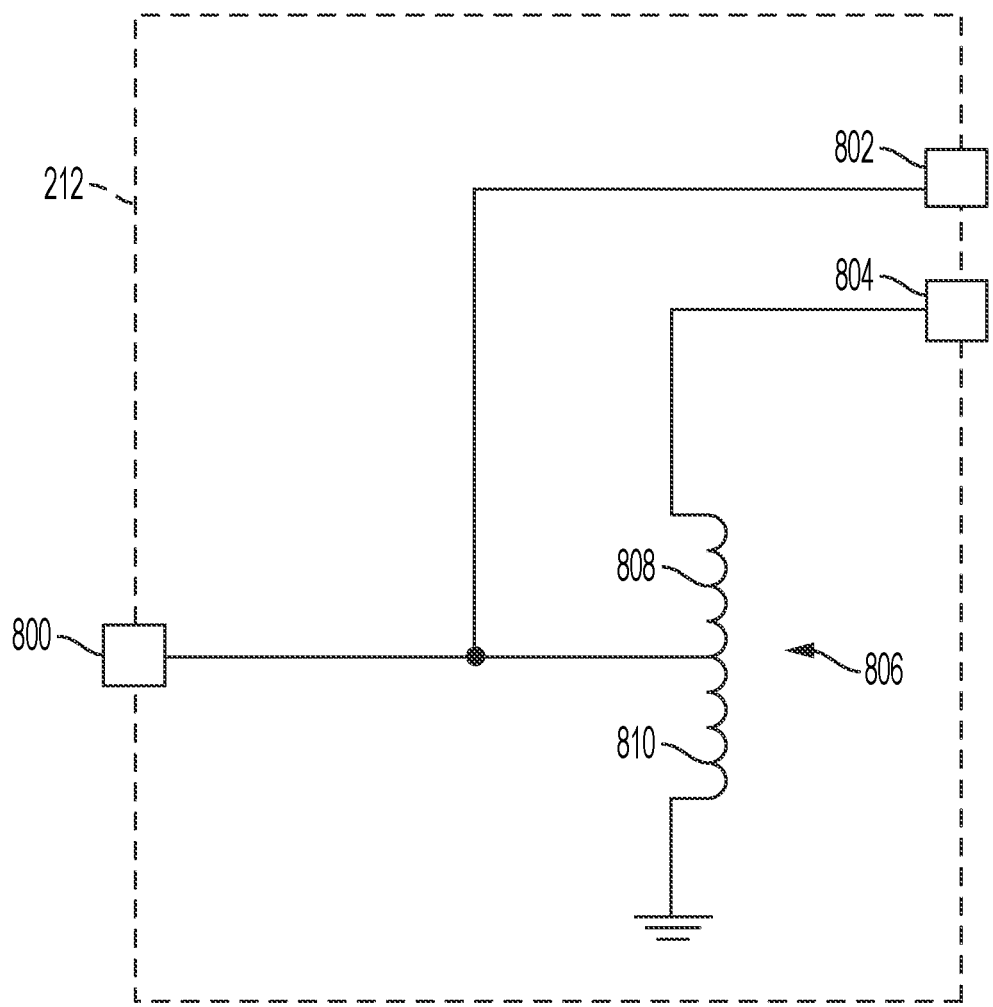
FIG. 8 illustrates a schematic diagram of a voltage converter according to an example.

As discussed above, the optional voltage converter 212 may be implemented in some examples to convert a voltage level of power received from the second current sensor 210. For example, the voltage converter 212 may include a transformer, such as an autotransformer, in some examples. FIG. 8 illustrates a schematic diagram of the voltage converter 212 according to one example. The voltage converter 212 includes an input 800, a first output 802, a second output 804, and an autotransformer 806. The autotransformer 806 includes a first winding 808 and a second winding 810. In various examples, the output 204, which may include multiple outputs as discussed above, may include the first output 802 and the second output 804.

The input 800 is coupled to the first output 802 and to the autotransformer 806. For example, the input 800 may be center-tapped between the first winding 808 and the second winding 810. The input 800 may be configured to be coupled to a source of power, such as the second current sensor 210. The first output 802 is coupled to the input 800 and is configured to be coupled to a load. For example, the load 108 may include the load to which the first output 802 is coupled. The second output 804 is coupled to the first winding 808 and is configured to be coupled to a load. For example, the load 108 may include the load to which the second output 804 is coupled. In some examples, the outputs 802, 804 may be coupled to the same load at the same or a different power connection of the load. In various examples, the outputs 802, 804 may alternately or additionally be coupled to different loads.

The first winding 808 is coupled to the second output 804 at a first connection, and is coupled to the input 800 and the second winding 810 at a second connection. The second winding 810 is coupled to the input 800 and the first winding 808 at a first connection, and is coupled to a reference node, such as a neutral node, at a second connection.

Power received at the input 800 may be provided to the first output 802 and to the autotransformer 806. The power provided at the first output 802 may have a first voltage level. The power provided to the autotransformer 806 may be converted to power of a different voltage level, depending on a location on the autotransformer 806 that a tap is placed. For example, the second output 804, being separated from the input 800 by the first winding 808, may draw power of a voltage level that is higher than the voltage level at which the power is provided to the autotransformer 806. A number of turns of the first winding 808 and/or the second winding 810, or a location at which the autotransformer 806 is tapped (for example, for connection to the input 800 and/or the second output 804), may affect a voltage level of power at the second output 804.

For example, the first winding 808 and the second winding 810 may be designed such that power received at the input 800 with a voltage level of 115 V is converted by the autotransformer 806 to provide, at the second output 804, power with a voltage level of 220 V. In this example, therefore, the first output 802 may provide power with a voltage of 115 V and the second output 804 may provide power with a voltage of 220 V. Accordingly, in examples in which the voltage converter 212 is included, output power with multiple voltage levels may be provided by the UPS 102 (for example, the UPS 250 and/or the UPS 750). In other examples, the voltage converter 212 may be omitted, and output power with a single voltage level may be provided by the UPS 102.

Various controllers, such as the controller 218, may execute various operations discussed above. Using data stored in associated memory and/or storage, the controller 218 also executes one or more instructions stored on one or more non-transitory computer-readable media, which the controller 218 may include and/or be coupled to, that may result in manipulated data. In some examples, the controller 218 may include one or more processors or other types of controllers. In one example, the controller 218 is or includes at least one processor. In another example, the controller 218 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An uninterruptible power supply (UPS) comprising:
 a first input configured to be coupled to, and receive main power from, a main power source;
 a second input configured to be coupled to, and receive backup power from, a backup power source;
 an output configured to be coupled to at least one load;
 at least one current sensor coupled to the first input;
 a four-quadrant inverter coupled to the first input, the second input, and the output;
 a DC/DC converter coupled to the second input and to the four-quadrant inverter; and
 at least one controller configured to control the four-quadrant inverter and the DC/DC converter to
  provide power derived from the first input to the second input to charge the backup power source by controlling the DC/DC converter and the four-quadrant inverter to draw power from the first input and provide charging power to the backup power source via the second input, and
provide power derived from the second input to the output to supplement the main power when the main power is available at the first input, wherein supplementing the main power includes
determining a difference between a power draw of the at least one load and the main power, and
controlling the DC/DC converter and the four-quadrant inverter to provide the difference between the power draw of the at least one load and the available main power.

2. The UPS of claim 1, wherein the at least one controller is further configured to receive, from the at least one current sensor while the main power is provided from the first input to the output, current information indicative of the main power received from the main power source.

3. The UPS of claim 2, wherein the at least one controller is further configured to control the four-quadrant inverter to provide the power derived from the first input to the second input responsive to determining based on the current information that the main power exceeds a power draw of the at least one load.

4. The UPS of claim 2, wherein the at least one controller is further configured to control the four-quadrant inverter to provide power derived from the second input to the output to supplement the main power responsive to determining based on the current information that the main power is less than a power draw of the at least one load.

5. The UPS of claim 2, wherein the at least one controller is further configured to:
determine, based on the current information, the difference between a power draw of the at least one load and the main power.

6. The UPS of claim 5, wherein the at least one controller is further configured to control the four-quadrant inverter in a current-source mode to provide the difference between the power draw of the at least one load and the main power.

7. The UPS of claim 1, wherein the at least one controller is further configured to:
receive, from the at least one current sensor, current information indicative of the main power received from the main power source; and
control the four-quadrant inverter, responsive to determining based on the current information that the main power is unavailable, to provide power derived from the second input to the output.

8. The UPS of claim 7, wherein the at least one controller is further configured to control the four-quadrant inverter in a voltage-source mode to provide the power derived from the second input to the output.

9. The UPS of claim 1, further comprising a voltage-level converter coupled to the output.

10. The UPS of claim 9, wherein the voltage-level converter includes an autotransformer.

11. A non-transitory computer-readable medium storing thereon sequences of computer-executable instructions for controlling a power supply comprising a first input configured to be coupled to a main power source, a second input configured to be coupled to a backup power source, an output configured to be coupled to at least one load, at least one current sensor coupled to the first input, a four-quadrant inverter coupled to the first input, the second input, and the output, and a DC/DC converter coupled to the second input and to the four-quadrant inverter, the sequences of computer-executable instructions including instructions that instruct at least one processor to:
control the four-quadrant inverter and the DC/DC converter to
provide power derived from the first input to the second input to charge the backup power source by controlling the DC/DC converter and the four-quadrant inverter to draw power from the first input and provide charging power to the backup power source via the second input, and
provide power derived from the second input to the output to supplement the main power when main power is available at the first input, wherein supplementing the main power includes
determining a difference between a power draw of the at least one load and the main power, and
controlling the DC/DC converter and the four-quadrant inverter to provide the difference between the power draw of the at least one load and the available main power.

12. The non-transitory computer-readable medium of claim 11, wherein the instructions are further configured to instruct the at least one processor to receive, from the at least one current sensor while the main power is provided from the first input to the output, current information indicative of the main power available from the main power source.

13. The non-transitory computer-readable medium of claim 12, wherein the instructions are further configured to instruct the at least one processor to control the four-quadrant inverter to provide the power derived from the first input to the second input responsive to determining based on the current information that the main power exceeds a power draw of the at least one load.

14. The non-transitory computer-readable medium of claim 12, wherein the instructions are further configured to instruct the at least one processor to control the four-quadrant inverter to provide the power derived from the second input to the output to supplement the main power responsive to determining based on the current information that the main power is less than a power draw of the at least one load.

15. The non-transitory computer-readable medium of claim 14, wherein the instructions are further configured to instruct the at least one processor to:
determine, based on the current information, the difference between the power draw of the at least one load and the main power.

16. The non-transitory computer-readable medium of claim 12, wherein the instructions are further configured to instruct the at least one processor to control the four-quadrant inverter in a current-source mode to provide a difference between the power draw of the at least one load and the main power.

17. The non-transitory computer-readable medium of claim 11, wherein the instructions are further configured to instruct the at least one processor to:
receive, from the at least one current sensor, current information indicative of the main power received from the main power source; and
control the four-quadrant inverter, responsive to determining based on the current information that the main power is unavailable, to provide power derived from the second input to the output.

18. The non-transitory computer-readable medium of claim 17, wherein the instructions are further configured to instruct the at least one processor to control the four-quadrant inverter in a voltage-source mode to provide generated AC power to the output.

19. A method of controlling a power supply comprising a first input configured to be coupled to a main power source, a second input configured to be coupled to a backup power source, an output configured to be coupled to at least one load, at least one current sensor coupled to the first input, a four-quadrant inverter coupled to the first input, the second input, and the output, and a DC/DC converter coupled to the second input and the four-quadrant inverter, the method comprising:
  providing, by the four-quadrant inverter and the DC/DC converter, power derived from the first input to the second input to charge the backup power source, wherein the four-quadrant inverter and the DC/DC converter draw power from the first input and provide charging power to the backup power source via the second input, and
  providing, by the four-quadrant inverter and the DC/DC converter, power derived from the second input to the output to supplement the main power when main power is available at the first input, wherein supplementing the main power includes
    determining a difference between a power draw of the at least one load and the main power, and
    controlling the DC/DC converter and the four-quadrant inverter to provide the difference between the power draw of the at least one load and the main power.

20. The method of claim 19, further comprising:
  receiving, from the at least one current sensor while the main power is provided from the first input to the output, current information indicative of the main power available from the main power source;
  determining, based on the current information, that the main power is less than a power draw of the at least one load; and
  providing, responsive to determining that the main power is less than the power draw of the at least one load, the power derived from the second input to the output to supplement the main power.

* * * * *